United States Patent [19]

Fischer

[11] 3,901,678
[45] Aug. 26, 1975

[54] PYRIDYLIUM-S-TRIAZINES FOR REGULATING PLANT GROWTH

[75] Inventor: Hanspeter Fischer, Bottmingen, Switzerland

[73] Assignee: Ciba-Geigy Corporation, Ardsley, N.Y.

[22] Filed: Oct. 25, 1974

[21] Appl. No.: 517,988

Related U.S. Application Data

[63] Continuation-in-part of Ser. No. 316,948, Dec. 20, 1972, Pat. No. 3,855,220, and a continuation-in-part of Ser. No. 460,405, April 12, 1974.

[30] Foreign Application Priority Data
Dec. 22, 1971  Switzerland.................. 18819/71

[52] U.S. Cl. ................ 71/74; 71/76; 71/93
[51] Int. Cl.² ............................ A01N 9/22
[58] Field of Search ............. 71/93, 74, 76

[56] References Cited
UNITED STATES PATENTS
3,498,981  3/1970  Culbertson.................. 71/93
3,510,483  5/1970  Trepanier................... 71/93
3,544,570  12/1970 Timmler et al................ 71/93

*Primary Examiner*—Elbert L. Roberts
*Assistant Examiner*—Catherine L. Mills
*Attorney, Agent, or Firm*—Frederick H. Rabin

[57] ABSTRACT

2,4-bis-pyridylium-s-triazines of the formula

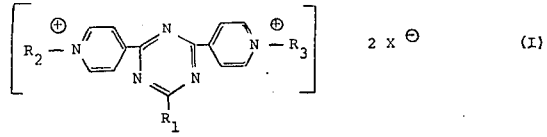

wherein $R_1$ represents hydrogen, lower alkyl, lower haloalkyl, $NH_2$, OH, phenyl, 4-pyridyl, $N'$-methyl-4'-pyridylium, $R_2$ and $R_3$ each independently represent alkyl, alkenyl, an alkyl radical substituted by halogen, alkoxy, alkylthio, cyano, alkoxycarbonyl, and X represents the anion of an inorganic or organic acid or a trivalent halogen anion, are growth regulating agents which produce increases in yield or quality in crop plants or which facilitate harvesting.

22 Claims, No Drawings

PYRIDYLIUM-S-TRIAZINES FOR REGULATING PLANT GROWTH

CROSS-REFERENCE TO RELATED APPLICATIONS

This is a continuation-in-part of my application Ser. No. 316,948, filed Dec. 20, 1972, now U.S. Pat. No. 3,855,220 and a continuation-in-part of my application Ser. No. 460,405, filed Apr. 12, 1974.

The present invention relates to quaternary salts which regulate plant growth and in particular with desiccating, defoliating and herbicidal action, a process for their manufacture, also to plant regulators and to a method of regulating plant growth, chiefly the desiccation and defoliation of parts of plants above the soil, and to a method of combating weeds which comprises the use of these quaternary salts as active substances. The term "plant growth" is to be understood as encompassing all stages of plant growth and development. The new quaternary salts correspond to the formula I:

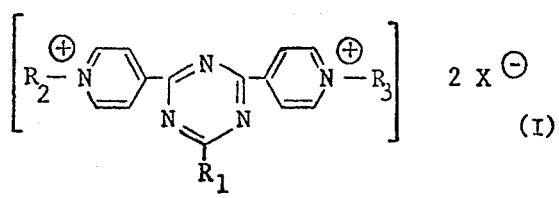

(I)

wherein $R_1$ represents hydrogen, lower alkyl, lower haloalkyl, $NH_2$, OH, phenyl, 4-pyridyl, N'-methyl-4'-pyridylium, $R_2$ and $R_3$ each independently represents alkyl, alkenyl, an alkyl radical substituted by halogen, alkoxy, alkylthio, cyano, alkoxycarbonyl, and X represents the anion of an inorganic or organic acid.

The alkyl radicals of the formula I are straight-chain or branched radicals with 1 to 8 carbon atoms, e.g. methyl, ethyl, n-propyl, isopropyl, n-butyl, isobutyl, sec.butyl, tert. butyl, n-pentyl, n-hexyl and n-octyl and the isomers of the alkyl radicals with 5 to 8 carbon atoms. The lower, straight-chain or branched alkyl radicals in particular, i.e. those with 1 to 4 carbon atoms, form the alkyl moiety of alkoxy and alkylthio radicals. Lower haloalkyl radicals are radicals with 1 to 4 carbon atoms which can be mono- or polysubstituted by halogen, especially fluorine. The $CF_3$ group is to be particularly mentioned. Alkenyl radicals can be straightchain or branched and possess 3 to 7 carbon atoms. Suitable examples are propenyl, butenyl, pentenyl, hexenyl and heptenyl; preferred are the allyl and methallyl radicals. For the symbol X as the anion of an inorganic or organic acid there may be considered, for example, the anions of the following acids: hydrohalic acids, such as hydrochloric, hydrobromic acid or hydroiodic acid, phosphoric acid, thioand dithiophosphoric acid, sulphuric acid, fluoroboric acid ($HBF_4$), perchloric acid, alkylsulphuric acid, such as methyl- or ethylsulphuric acid, arylsulphuric acids, such as benzenesulphonic acid or p-toluenesulphonic acid, naphthoic acids, benzoic acid, halobenzoic acids, acetic acid, haloacetic acids, aminoacetic acid, propionic acid, halopropionic acids, butyric acid, lactic acid, stearic acid, aliphatic dicarboxylic acids, such as oxalic acid, tartaric acid, fluorosulphuric acid. X can also represent a trivalent halogen anion preferably $I_3^-$, $Br_3^-$, $Br_2Cl^-$, $I_2Br^-$ or $Br_2I^-$.

Preferred compounds of the formula Ia

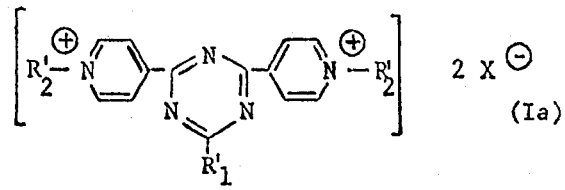

(Ia)

wherein $R_1'$ represents hydrogen or lower alkyl, chiefly methyl, $R_2'$ represents lower alkyl, chiefly methyl or ethyl, and $X^-$ represents one of the anions chloride, bromide, iodide, methosulphate ($CH_3OSO_2^-$), fluorosulphate ($FSO_2^-$), triodide or tribromide.

Compounds of the formula Ia to which particular interest attaches are those in which $R_1'$ is hydrogen.

The new quaternary salts of the formula I are obtained by a method known in itself, i.e. by quaternisation of the 2,4-dipyridyl-s-triazines of the formula II

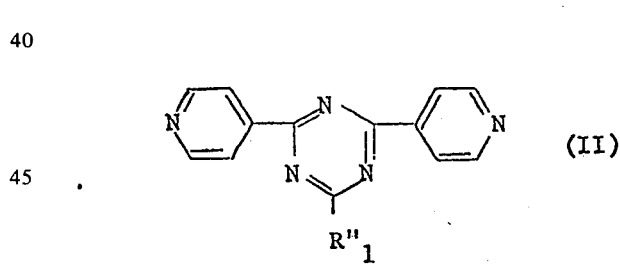

(II)

wherein $R_1''$ represents hydrogen, lower alkyl, halosubstituted lower alkyl, $NH_2$, OH, phenyl, 4-pyridyl. As quaternising agents for the complete or stepwise alkylation (or alkenylation) of the pyridyl radicals there are used accordingly one or two molar equivalents of the compound $R_2$-X or one molar equivalent of each of the compounds of the formulae $R_2$—X and $R_3$—X wherein $R_2$ and $R_3$ have the meanings given for the formula I and X represents halogen, alkylsulphonyloxy, alkoxysulphonyloxy, arylsulphonyloxy, fluorosulphonyloxy. If $R_1$ represents OH, it is possible to carry out the reaction in the presence of one molar equivalent of a strong base, such as an alkali alcoholate. If $R_1''$ in its significance of 4-pyridyl is to be converted into the 4-N-methylpyridylium radical, it is also necessary for the 4-pyridyl radical to be quaternised, optionally in an independent reaction, with methyl halide or dimethyl sulphate.

It is advantageous to carry out the quaternisation in the presence of a solvent or diluent which is inert towards the reactants, such as an aromatic hydrocarbon, for example benzene, toluene or xylene, a chlorinated hydrocarbon, e.g. chlorobenzene, an N-alkylated acid amide, such as dimethyl formamide, sulphoxides, such as dimethyl sulphoxide, nitriles, such as acetonitrile, ketones, such as acetone or methyl ethyl ketone, alcohols, in particular lower alkanols, ethers and ethereal compounds, water, or mixtures of such solvents. The quaternisation temperatures are between −20°C and +250°C. The reaction times are from 15 minutes to several days and are dependent to a considerable extent on the reactivity of the reactants and the solvent used. The quaternary salts obtained are optionally reacted to exchange the anion of a possibly phytotoxic acid for other non-phytotoxic inorganic or organic acids. For example, the halogen anion of a resulting quaternary salt can be easily exchanged for the anion of any desired inorganic or organic acid by a. conversion of the halide into the hydroxide and subsequent neutralisation with the corresponding acid,
b. treatment of the halide or hydroxide with anion exchanger, or, if an iodine or bromine ion is present,
c. reaction with $I_2$ to form $I_3$ or with $Br_2$ to form $Br_3$.

The intermediate products of the general formula II can be manufactured by several process variants:

1. Either one mole of
  1.1 (4-amidinopyridine (=4-carbamimidoyl-pyridine) or
  1.2 of a 4-alkoxycarbonimidoyl-pyridine

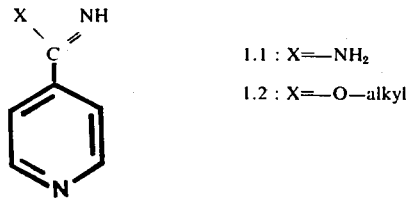

1.1 : X=—NH₂
1.2 : X=—O—alkyl is reacted in the presence of an acylating agent in a single or multi-step process with 1 mole of 4-amidinopyridine [J. org. Chem. 30, 707 (1965); J. Synth. Org. Chem. 27, 551 (1969)], or 2. one mole of
  2.1 urea, guanidine or amidine of the formula

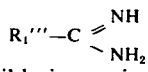

in one of the possible isomeric forms, or one mole of
  2.2 a compound of the formula $R_1'''$—CN, wherein $R_1'''$ represents lower alkyl, phenyl or 4-pyridyl, is reacted with two moles of 4-cyanopyridine.

The reactions of types 1 or 2 can be carried out in the presence, or absence, of a catalyst. Type 2 is preferably carried out in the presence of a catalyst. Suitable catalysts are acids, such as mineral acids (hydrochloric acid, sulphuric acid) or Lewis acids, ($AlCl_3$, $ZnCl_2$, $BF_3$), also bases such as tertiary amines, alkali hydroxides, alkali alcoholates, sodium hydride and others. The choice of catalyst is dependent in each case on the reactants.

Depending on the particular reaction, suitable acylating agents are corresponding carboxylic acids, esters, amides, chlorimonium slats, amidines and their salts, alkyl cyanides, aryl cyanides, acid halides, acid anhydrides, ortho-esters, aminoacetals, cyanogen halide, phosgene etc.

The starting materials for reaction type 1 or 2 are known or can be prepared by known methods.

For example, 4-amidinopyridine and its salts are known from J.Am.Chem.Soc, 75, 1933–1942 (1953) and J. Org.Chem. 19, 753–757 (1954). This compound is obtained by converting 4-cyanopyridine with an alkanol, such as ethanol, into the corresponding iminoether (imido ester) and heating this latter with aqueous ammonium chloride solution.

The most important compounds of the formula II which are used as intermediate products for the quaternary salts of the formula I and wherein $R'''$ represents hydrogen, are manufactured preferably by reacting 2 molar equivalents of 4-amidinopyridine with 1 molar equivalent of a formylating agent in the absence of a solvent. Examples of suitable formylating agents are: formic acid, formamide, esters of formic acid, dialkyl formamide, chloro-N,N-dimethylformamidinium chloride, formamidine, dimethylamino-bis(alkoxy)-methane, s-triazine or the formyl chloride which is formed as an intermediate from CO and HCl. A very advantageous formylating agent is the 2-azapropenylidene ammonium salt of the formula

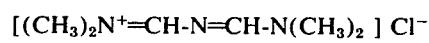

(cf. Ångewandt Chemie 72,959 [1960]), which is obtained by reacting cyanuric chloride with dimethyl formamide at about 50°C.

The reaction of 4-amidino-pyridine or the salts thereof with an azapropenylidene ammonium salt is carried out at temperatures between 130°C and 200°C in the presence or absence of a solvent or diluent.

The compounds of the formula II, in which $R_1''$ represents alkyl, halosubstituted lower alkyl or phenyl, which are used as intermediate products for the quaternary salts of the formula I, are preferably manufactured by reacting 2 molar equivalents of 4-amidinopyridine hydrochloride with 1 molar equivalent of an acid anhydride ($R_1''$—CO—)₂O in the presence of a mild base, or with 1 molar equivalent of a salt of the formula $R_1''$-COO alkali. The reaction temperatures lie between 50°C and 150°C. [Chem. Ber. 11, 4 (1878); ibid. 23,161 (1890)].

The compounds of the formula II, wherein $R_1''$ represents OH or $NH_2$, which are used as intermediate products for the quaternary salts of the formula I, are manufactured preferably by reacting 4-cyanopyridine with urea or guanidine (or guanidine hydrochloride) in the presence of a strong base, such as an alkali alcoholate, sodium or sodium hydride, in a solvent (alkanol, dimethyl sulphoxide). [J.Am.Chem.Soc. 81, 905 (1959)].

The intermediate product 2,4,6-tris(4-pyridyl)-s-triazine for the manufacture of corresponding quaternised salts according to formula I is manufactured by trimerisation of 4-cyanopyridine in the presence of sodium hydride in the melt. [Chem. Commun. 1971, 498].

For example, the following most important intermediate products of the formula II can be manufactured by the indicated methods:

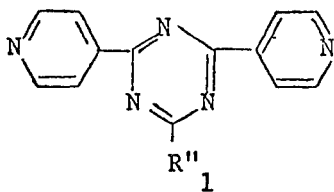

| $R''_1$ | Melting Point °C | $R''_1$ | Melting Point °C |
|---|---|---|---|
| H | 186–187 | 4-pyridyl | > 350 |
| $CH_3$ | 162–163 | phenyl | 298–300 |
| $C_2H_5$ | 141–144 | $CF_3$ | 152–157 |
| $NH_2$ | 310–312 | n—$C_4H_9$ | 110–115 |
| OH | > 300 | | | as well as the intermediate product of the formula

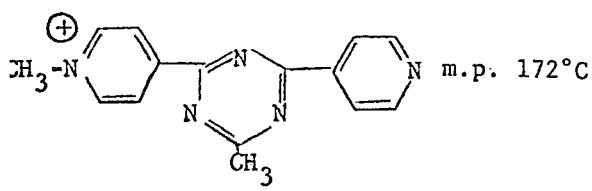

m.p. 172°C

The following Examples illustrate the individual process variants for the manufacture of compounds of the formula I.

EXAMPLE 1 a. 416 g of 4-cyanopyridine (4.0 moles) were dissolved in 1600 ml of methanol, then 4 g of sodium in 400 ml of dry methanol were added at 15°C. The temperature rose to 30°C and was then kept at 28°–30°C with an ice bath. The reaction mixture was stirred for 4 hours, then 235.6 g of ammonium chloride in 400 ml of water were added. The temperature was kept continuously at 28°–30°C. The reaction mixture, which turned clear after some time, was stirred overnight at room temperature and a practically colourless precipitate formed. Yield: 540 g of 4-amindino-pyridine hydrochloride (m.p. 248°–250°C).

b. 97 g (0.615 mole) of 4'-amidino-pyridine hydrochloride and 127.5 g (0.778 mole) of 3-dimethylamino-2-azaprop-2-en-ylidene-dimethylammonium chloride were thoroughly mixed in a mortar. The reaction mixture was heated for 2 hours to 120°C, in the course of which it became viscous. It was subsequently heated for 18 hours to 140°C. The congealed reaction mixture was then triturated in small amounts at a time with 1000 ml of water. The precipitate was filtered and washed with distilled water until the washings ran free from chloride.

Yield: 65.4 g of 2,4-bis-(4'pyridyl)-s-triazine (m.p. 186°–187°C).

c. 23.5 g of 2,4-bis-(4'-pyridyl)-s-triazine were dissolved in 500 ml of absolute methanol. To this solution were added 31.2 g of methyl iodide and the mixture was stirred for about 14 hours at 80°C under reflux. It was then cooled to 0°C and the residue was filtered off.

Yield: 41.9 g of 2,4-bis-(N'-methyl-4'-pyridylium)-s-triazine iodide (m.p. 248°–251°C).

d. 62 g (0.263 mole) of 2,4-bis-(4'-pyridyl)-s-triazine were dissolved in 800 ml of methylene chloride in an agitator flask. Then $CH_3$—O—$SO_2$—F was added dropwise at room temperature over about 30 minutes. The temperature was kept at 30°–35°C with an ice bath. A grey precipitate formed. Stirring was continued overnight at room temperature and the batch was filtered, to give 120.4 g of 2,4-(N'-methyl-4'-pyridylium)-s-triazinefluorosulphate (m.p. > 220°C, with decomp.).

e. 225 g of 2,4-bis(4'-pyridyl)-s-triazine and 228 g of methyl bromide were heated with 1000 ml of methanol for 52 hours to 80°C in a pressure autoclave. Yield: 320 g of 2,4-bis(N'-methyl-4-pyridylium)-s-triazine-dibromide (m.p. > 260°C, with decomp.).

f. 15 g of 2,4-bis(4'-pyridyl)-s-triazine, 30 ml of dimethyl sulphate and 100 ml of methanol were heated for 24 hours under reflux. The mixture was concentrated and the concentrate dried in a high vacuum to give 32 g of 2,4-bis-(N'-methyl-4'-pyridylium)-s-triazine-bis-methosulphate in the form of a viscous oil) $n_D^{20} 1.4942$).

EXAMPLE 2 a. 78.5 g (0.5 mole) of well dried 4-amindino-pyridine hydrochloride, 41 g (0.5 mole) of anhydrous sodium acetate and 600 ml of acetic anhydride were charged into an agitator flask. The mixture was stirred for 2 hours at 180°C, then excess acetic anhydride was distilled off. The brown, oily residue was treated with 500 ml of water and the resulting voluminous precipitate, which was washed repeatedly with distilled water, was filtered. Yield: 36 g of 2-methyl-4,6-bis-(4'-pyridyl)-s-triazine (m.p. 162°–163°C).

b. 55 g (0.22 mole) of 2-methyl-4,6-bis-(4pyridyl)-s-triazine were suspended in 600 ml of methanol in an agtator flask. Then 100 ml of methyl iodide were added and the batch was heated for 48 hours under reflux. The batch was cooled to room temperature and the precipitate then filtered, to give 105.3 g of 2-methyl-4,6-bis(N'-methyl-4'-pyridylium)-s-triazine-diiodide (m.p. > 285°C, with decomp.).

c. 2.5 g (0.1 mole) of 2,4-bis(4-pyridyl)-6-methyl-s-triazine were dissolved in 25 ml of methylene chloride and 1.1419 g (0.01 mole) of methyl iodide were subsequently added. The reaction mixture was stirred for 24 hours at room temperature, in the course of which a yellow precipitate formed which was filtered off, to give 2.4 g of 2-methyl-4-(4'-pyridyl)-6-(N''-methyl-4''-pyridylium)-s-triazine-iodide (m.p. 284°–287°C, with decomp.).

d. 1.95 g (0.005 mole) of 2-methyl-4-(4'-pyridyl)-6-(N''-methyl-4''-pyridylium)-s-triazine-oidide were dissolved in 150 ml of methanol with gentle heating. Then 1.55 g (0.01 mole) of ethyl iodide were added and the reaction mixture was heated for 36 hours under reflux. The solution, which had turned clear, was then concentrated to dryness. The resulting reddish brown product was then taken up in about 150 ml of methylene chloride, and the solution stirred and filtered. Yield: 2.1 g of 2-methyl-4-(N'-ethyl-4'-pyridylium)-6-(N''-methyl-4''-pyridylium)-s-triazine-diiodide (m.p. 250°–256°C, with decomp.).

EXAMPLE 3 a. 15.7 g (0.1 mole) of 4-amidinopyridine hydrochloride and 120 ml of propionic anhydride were charged into a flask. While stirring, 8.2 g (0.1 mole) of sodium acetate (anhydrous) were added and the mixture was heated for 2 hours to 180°C. Excess anhydride was distilled off in a high vacuum. The residue, a brown oil, was chromatographed over a silica gel column. A crude product was obtained which was recrystallised from ethyl acetate. Yield: 1.8 g of 2-ethyl-4,5-bis(4'-pyridyl)-s-triazine (m.p. 141°–144°C).

b. 1.1 g (0.00417 mole) of 2-ethyl-4,5-bis-(4'-pyridyl)-s-triazine were dissolved in 15 ml of methanol. Then 4.52 g (0.0319 mole) of methyl iodide were added and the mixture was heated for 48 hours under reflux. The reddish brown precipitate was filtered and washed 3 times with about 10 ml of ether. Yield: 1.9 g of 2-ethyl-4,6-bis(N'methyl-4'-pyridylium)-s-triazine-diiodide (m.p. 286°–290°C, with decomp.).

c. 8.2 g (0.1 mole) of sodium acetate and 100 g of valeric anhydride were charged into a flask and 4-amidinopyridine hydrochloride was then added. The reaction mixture was stirred for 16 hours at 180°C, in the course of which a brown, viscous product formed. This product was taken up in water and the solution was extracted 3 times with 250 ml of methylene chloride on each occasion. The combined extracts were washed with dilute $NaHCO_3$ solution, dried over magnesium sulphate and evaporated, to yield 101.2 g of a brown oil which was purified by column chromatography. This oil in turn yielded 6.1 g of a product from which, by recrystallisation from isopropanol, there were obtained 1.4 g of 2-n-butyl-4,6-bis (4'-pyridyl)-s-triazine (m.p. 110°–115°C).

d. 1.2 g of 2-n-butyl-4,6-bis(4'pyridyl)-s-triazine were dissolved in 15 ml of methanol and the solution was treated with 2 ml of methyl iodide. The reaction mixture was heated for 24 hours under reflux, in the course of which a dark red precipitate formed which was filtered off and washed twice with about 30 ml of acetone. Yield: 2,0 g of 2-n-butyl-4,6-bis(N'-methyl-4'-pyridylium)-s-triazine-diiodide (m.p. 285°–290°C, with decomp).

EXAMPLE 4 a. 9.5 g of guanidine hydrochloride were dissolved in 100 ml of absolute alcohol. While stirring and cooling, 2.3 g of sodium were added in small amounts. The precipitated sodium chloride was filtered off. The filtrate was treated with 10.4 g of 4-cyanopyridine and the mixture heated for 15 hours under reflux. It was then cooled to 5°C and filtered. The solid product was boiled for 2 hours and filtered once more, to give 3,3 g of 2-amino-4,6-bis(4'-pyridyl)-s-triazine (m.p. 310–312°C).

b. 22 g of 2-amino-4,6-bis(4'-pyridyl)-s-triazine, 15 g of methyl iodide and a mixture of 100 ml of dimethyl sulphoxide and 150 ml of methanol were heated under reflux for 72 hours. The precipitate which formed was filtered hot. Yield: 11.8 g of 2-amino-4,6-bis(N'-methyl-4'-pyridylium)-s-triazine-diiodide (m.p. > 300°C).

EXAMPLE 5 a. 20.8 g (0.2 mole) of 4-cyanopyridine, 6.1 (0.1 mole) of urea and 2.4 g of NaH (0.1 mole) were stirred in 200 ml of dimethyl sulphoxide (absolute) initially for 3 hours at room temperature, then for 33 hours at 110°C bath temperature. The reaction mixture was concentrated at a bath temperature of 90°–95°C. The residue was stirred with 200 ml of acetone and 200 ml of ethanol and filtered off. Yield: 18.3 g of 2-hydroxy-4,6-bis(4'-pyridyl)-s-triazine (m.p. > 300°C).

b. 2.5 g (0.01 mole) of 2-hydroxy-4,6-bis(4'-pyridyl)-s-triazine were charged into a flask in 30 ml of methanol. 5 g of methyl iodide were added thereto and the reaction mixture was heated for 30 hours under reflux. The precipitated final product was filtered off and washed twice with about 30 ml of methanol. Yield: 2.7 g of 2-hydroxy-4,6-bis(N'-methyl-4'-pyridylium)-s-triazine-diiodide (m.p. > 300°C).

EXAMPLE 6 a. 12 g of 4-cyanopyridine were charged into an agitator flask under nitrogen, and 0.2 g of sodium hydride was added. The temperature was kept at 160°–165°C for 5 hours. The precipitate which formed was filtered off, stirred 3 times with 100 ml of acetone each time and filtered once more. Yield: 9.3 g of 2.4,6-tris(4'-pyridyl)-s-triazine (m.p. > 340°C).

9 g of 2,4,6-tris(4'-pyridyl)-s-triazine were heated together with 30 ml of methyl iodide in 30 ml of methanol for 36 hours under reflux. 21.8 g of 2,4,6-tris(N'-methyl-4'-pyridylium)-s-triazine-triiodide were precipitated from the concentrated solution; m.p. 260°C.

c. 3.12 g (0.01 mole) of 2,4,6-tris(4'-pyridyl)-s-triazine were partially dissolved in 100 ml of dimethyl sulphoxide. After filtration, the solution was treated with 2.8 g (0.02 mole) of methyl iodide and stirred for 24 hours at 80°C. Yield: 1.9 g of 2-(4'-pyridyl)-4,6-bis(N''-methyl-4''-pyridylium)-s-triazine-diiodide (m.p. > 310°C) in the form of a dark red precipitate.

EXAMPLE 7 a. 8.2 g (0.1 mole) of sodium acetate and 100 g of benzoic anhydride were charged into a flask. Thereto were added 15.76 g (0.1 mole) of 4-amidinopyridine hydrochloride. The mixture was heated for 18 hours to 180°C, then taken up in 300–400ml of methanol and undissolved constituents were filtered off. The filter residue was washed free from chloride 3 times with 50 ml of methanol on each occasion and then 4 times with 50 ml of water on each occasion. Yield: 9.4 g of 2-phenyl-4,6-bis(4'-pyridyl)-s-triazine (m.p. 298°–300°C).

b. 5.96 g (0.042 mole) of methyl iodide were added to a solution of 3.11 g (0.01 mole) of 2-phenyl-4,6-bis(4'-pyridyl)-s-triazine in 100 ml of dimethyl sulphoxide. The reaction mixture was stirred for 24 hours at a bath temperature of 80°C, then cooled, to yield 4.8 g of 2-phenyl-4.6-bis(N'-methyl-4'-pyridylium)-s-triazine-diiodide (m.p. > 310°C).

EXAMPLE 8 a. 15.76 g (0.1 mole) of 4-amindino-pyridine hydrochloride were added at 10°C to a mixture of 8.2 g (0.1 mole) of sodium acetate and 65 ml of trifluoro-acetic anhydride. The reaction mixture was kept for 2 hours at 100°c in a Carius tube and, after it had C cooled, concnetrated in a rotary evaporator. Upon addition of water a brown oil was precipitated from the residue and discarded. The residual solution was extracted 3 times with 150 ml of methylene chloride each time. The combined extracts were washed initially with NaHCO₃ solution and then with water and subsequently dried over magnesium sulphate. The solution was concentrated to yield 1.8 g of 2-trifluoromethyl-4.6-bis(4'-pyridyl)-s-triazine (m.p. 152°–157°C).

b. A mixture consisting of 1.5 (0.00495 mole) of 2-trifluoromethyl-4,6-bis-(4'-pyridyl)-s-triazine, 30 ml of methanol and 2 g (0.0141 mole) of methyl iodide, was heated for 30 hours under reflux, then concentrated in a rotary evaporator, cooled and filtered. The precipitate was washed with benzene. Yield: 2.26 g of 2-trifluoromethyl-4,5-bis(N'-methyl-4'-pyridylium)-s-triazine-diiodide (m.p. >300°C).

EXAMPLE 9

47.5 g (0,46 moles) of sodium bromide were dissolved in 4.5 l of water in an open beaker. To this solution was added at room temperature while stirring mechanically, 59 g (0.37 moles) (19 ml) of bromine, which gave a red-brown solution. To this was then added dropwise under stirring at room temperature an aqueous solution of 78 g (0.184 moles) of 2,4 bis (N'-methyl-4'-pyridylium)-s-triazine dibromide. A precipitation fell out immediately. Stirring was continued for 10 minutes after all the pyridylium-solution was added. The slighly orange colored precipitate was then filtered off. The residue was dried at 50°C under vacuum for 16 hours and 122 g of 2,4 bis-(N'-methyl-4-pyridylium)-s-triazine bis tribromide F 253–255°C was thus obtained.

It is also possible to manufacture the following compounds by one of the methods indicated in Examples 1 to 9:

| Compound | Melting Point Refractive Index |
| --- | --- |
| 2,4-bis-(N'-methyl-4'-pyridylium)-s-triazine-diiodide | 250° |
| 2,4-bis-(N'-ethyl-4'-pyridylium-s-triazine-diiodide | 160° |
| 2,4-bis-(N'-isopropyl-4'-pyridylium)-s-triazine-diiodide | 210° |
| 2,4-bis-(N'-ethoxy-carbonylmethyl-4'-pyridylium)-s-triazine-dichloride | $n_D^{20}$ 1.5430 |
| 2,4-bis-(N'-n-propyl-4'-pyridylium)-s-triazine-diiodide | 160°–162° |
| 2,4-bis-(N'-methyl-4'-pyridylium)-s-triazine-bis triiodide (I₃⁻) | 200° |
| 2,4-bis-(N'-chloroethyl-4'-pyridylium)-s-triazine-dibromide | 160–162° |
| 2,4-bis-(N'-methoxymethyl-4'-pyridylium)-s-triazine-dichloride | 299–301° |
| 2,4-bis-(N'-methylthioethyl-4'-pyridylium)-s-triazine-dichloride | $n_D^{20}$ 1.5580 |
| 2,4-bis-(N'-cyanomethyl-4'-pyridylium)-s-triazine-dichloride | 210° (decomp.) |
| 2,4-bis-(N'-n-octyl-4'-pyridylium)-s-triazine-diiodide | > 250° |
| 2,4-bis-(N'-γ-chloropropyl-4'-pyridylium)-s-triazine-dibromide | 250° |
| 2,4-bis-(N'-allyl-4'-pyridylium)-s-triazine-dichloride | 70–80° (decomp.) |
| 2,4-bis-(N'-ethyl-4'-pyridylium)-6-methyl-s-triazine-diiodide | 125° (decomp.) |
| 2,4-bis-(N'-n-propyl-4'-pyridylium)-6-methyl-s-triazine-diiodide | > 110°(decomp.) |
| Compound | Melting Point |
| 2,4-bis-(N'-isopropyl-4'-pyridylium)-6-methyl-s-triazine-diiodide | > 225° (decomp.) |
| 2,4-bis-(N'-n-octyl-4'-pyridylium-6-methyl-s-triazine-diiodide | > 160° (decomp.) |
| 2,4-bis-(N'-methyl-4'-pyridylium)-s-triazine-dichloride | 314–316° |
| 2,4-bis-N'-methyl-4'-pyridilium-s-triazine-dibromide | 318–320° |

The technical applicability of the new quaternary salts is based on their growth regulating properties which produce increases in yield or quality in the crop products of the useful plants or which help facilitate harvesting. The bis(pyridylium)-s-triazines of the formula I are particularly suitable for the defoliation or desiccation of parts of plants above the soil in individual plant species, e.g. in cotton, leguminous plants, sorghum, soya, potatoes, vines; or they are also suitable for the defoliation of shrubs or trees which are destined for dispatch. In low rates of application the compounds effect an abscission of fruit such as citrus fruit, cherries, vines, damsons, berries, nuts. A further property is the favourable regulation of the storage capacity of vegetable matter contained in plants and the concomitant prevention of the premature degradation of such matter. As an example there may be cited the increase in the starch content in potato tubers or the increase in the sugar content in sugar beet or sugar cane. Particular mention is to be made of the ripening of sugar cane, in which the unwanted degradation of sucrose is prevented in connection with the suppression of the new shoots of plant parts. The compounds of the formula I also posses selective herbicidal action, above all as contact herbicides.

The diversity of the plant growth regulation is illustrated by the following Examples.

EXAMPLE 10

Defoliation of Cotton Plants

An active substance solution (about 5%) was sprayed in a rate of application of 1 kg, 0.5 kg and 0.25 kg per hectare on a strip of cotton field with 70–80% of opened capsules. As comparative substances there were used the known commercial defoliants DEF (=tri-n-butyl-trithiophosphate), Folex (=tri-N-butyl-trithiophosphite) and the compound 2,5-bis (N''-methyl-4''-pyridinium)-1,3,4-thiadiazole-diiodide (known from French Pat. No. 1.547,531) of the formula A

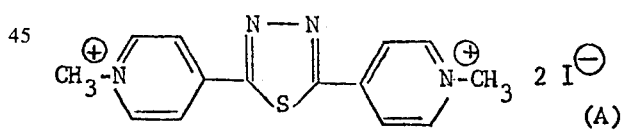

(A)

The 1st and 2nd evaluation took place after 7 and 14 days and yielded the following result:

| Compound | kg.AS/ha | Evaluation after 7 days | 14 days |
| --- | --- | --- | --- |
| 2,4-bis(N'-n-propyl-4'-pyridylium)-s-triazine-diiodide | 1,0 | 3 | 1 |
| | 0,5 | 7 | 2 |
| | 0,25 | 7 | 3 |
| 2,4-bis(N'-ethyl-4'-pyridylium)-s-triazine-diiodide | 1,0 | 2 | 1 |
| | 0,5 | 2 | 2 |
| | 0,25 | 4 | 2 |
| 2,4-bis(N'-methyl-4'-pyridylium)-s-triazine-diiodide | 1,0 | 2 | 1 |
| | 0,5 | 2 | 1 |
| | 0,25 | 5 | 2 |
| 2,4-bis(N'-methyl-4'-pyridylium)-s-triazine-dibromide | 1,0 | 2 | 1 |
| | 0,5 | 2 | 1 |
| | 0,25 | 2 | 2 |
| DEF | 1,0 | 7 | 1 |

-Continued

| Compound | kg.AS/ha | Evaluation after 7 days | 14 days |
|---|---|---|---|
|  | 0.5 | 7 | 3 |
|  | 0.25 | 7 | 3 |
| Folex | 1.0 | 8 | 2 |
|  | 0.5 | 7 | 1 |
|  | 0.25 | 7 | 2 |
| A | 1.0 | 4 | 2 |
|  | 0.5 | 7 | 3 |
|  | 0.25 | 9 | 3 |

Rating:
9 = 0 to 11% defoliation
8 = 12 to 22% defoliation
7 = 23 to 33% defoliation
1 = 89 to 100% defoliation

EXAMPLE 11

Desiccation of Potato Plants

In two parallel tests plots measuring 2.5 × 10 m² with potatoes of the variety "Bintje", which were 2-3 weeks from being ripe for harvesting, were sprayed with active substance solution. The application was carried out with about 1000 litres of spray broth per hectare in rates of application of 5 kg, 2.5 kg and 1.25 kg per hectare. The commercial desiccant 2-methyl-4,6-dinitrophenol (=DNOC) was used as comparative compound. The 1st and 2nd evaluation took place after 7 and 14 days yielded the following result:

| Compound | kg AS/ha | Evaluation after 7 days | 14 days |
|---|---|---|---|
| 2,4-bis(N'-ethyl-4'-pyridylium)-s-triazine-diiodide | 5.0 | 4.5 | 1 |
|  | 2.5 | 7.5 | 2 |
|  | 1.25 | 8.5 | 4 |
| 2,4-bis(N'-methyl-4'-pyridylium)-s-triazine-dibromide | 5.0 | 3.5 | 1 |
|  | 2.5 | 5.5 | 1 |
|  | 1.25 | 7 | 1.5 |
| DNOC | 5.0 | 4 | 2 |
|  | 2.5 | 8 | 5.5 |

Rating:
1 = plants above the soil completely desiccated
9 = no action
2 - 8 = intermediate stages of desiccation

EXAMPLE 12

Citrus abscission

Citrus sinensis plants were raised in pots in a greenhouse. After the cultivation, branches about 35 cm long were cut off from which all the foliage and the majority of the petioles were removed, so that the branch only bore 8 petioles. Two branches were sprayed with an active substance concentration and individually placed in an Erlenmeyer flask with mains water at 21°C and 75% relative humidity in a conditioning cabinet. The branches were exposed to about 10.5 hours of light per day (about 20,000lux). Evaluation of the abscission of the 16 petioles per active substance concentration took place after 3 and 4 days and permitted a direct conclusion to be drawn with regard to the abscission of citrus fruit.

| Compound | Concentration of active substance [ppm] | Petioles shed after 3 days | 4 days |
|---|---|---|---|
| 2,4-bis(N'-methyl-4'-pyridylium)-s-triazine-dibromide | 4000 | 15 | 16 |
|  | 2000 | 14 | 16 |
| 2,4-bis(N'-n-propyl-4'-pyridylium)-s-triazine-diiode | 4000 | 4 | 12 |
|  | 2000 | 2 | 8 |
| 2,4-bis(N'-methyl-4'-pyridylium)-s-triazine-dichloride | 4000 | 12 | 16 |
|  | 2000 | 8 | 13 |

EXAMPLE 13

Application to Sugar Cane

Fifteen 21 to 24 months old sugar cane plants were each treated with an aqueous active substance solution. The solution with 38 mg of active substance per plant (=3.5 kg of active substance/ha) was introduced into the leaf rachises. Harvesting took place after 4 weeks in one test, after 5 weeks in the other. The influence of the active substance on the sugar content was determined by measuring the pressed juice polarimetrically and in comparison with the press juice of untreated plants. The active substance 2,3,6-trichlorobenzoic acid, known from U.S. Pat. No. 3.245.775 and recommended for treating sugar cane, was used as comparative substance.

| Compound | Sugar content in pressed juice after 4 weeks | 5 weeks |
|---|---|---|
| 2,4-bis(N'-methyl-4'-pyridylium)-s-triazine-diiodide | 9.8 % | 10.9 % |
| 2,3,6-trichlorobenzoic acid | 9.3 % | 10.2 % |
| untreated control | 8.8 % | 8.8 % |

EXAMPLE 14

Plots in cotton fields in Mississippi, USA and in Spain were sprayed with a solution containing 5 and 2,5 kg per hectare of test substance, when the field had 70 to 80% of opened bolls. The evaluation took place after two weeks and the rate of defoliation (def) and dessication (dess) is expressed in percenit as compared to other, not treated plats in the same cotton fields.

The results are given in the table below

| Compound | kg AS/na | Missippi USA def | dess | Spain def | dess |
|---|---|---|---|---|---|
| 2,4-bis-(N'-methyl-4'-pyridilium-s-triazine-diiodide | 5 | 75% | 35% | 12% | 60% |
|  | 2.5 | 75% | 25% | 0% | 70% |
| 2,4-bis-(N'-methyl-4'-pyridilium)-s-triazine-di-methosulfate | .5 | 90% | 55% | 13% | 15% |
|  | 2.5 | 60% | 55% | 5% | 15% |
| 2,4-bis-(N'-methyl-4'-pyridilium)-s-triazine-dibromide | 5 | 65% | 0% | 15% | 99% |
|  | 2.5 | 70% | 90% | 15% | 83% |
| 2,4-bis-(N'-methyl-4'-pyridilium)-s-triazine-di-fluorosulfate | 5 | 85% | 30% | 0% | 87% |
|  | 2.5 | 75% | 20% | 5% | 45% |
| 2,4-bis-(N'-methyl-4'-pyridilium)-s-triazine-dichloride | 5 | 65% | 95% | 10% | 99% |
|  | 2.5 | 80% | 95% | 18% | 68% |
| 2,4-bis-(N'-methyl-4'-pyridilium)-s-triazine-bis(tribromide) | 5 | 80% | 95% | 20% | 93% |
|  | 2.5 | 95% | 10% | 25% | 53% |
| control (untreated) |  | 0% | 0% | 0% | 0% |

The agents according to the invention contain either the new active substances alone or in combination with other biocidal active substances. In this way it is possible to broaden and improve their activity spectrum and to adapt it to given circumstances. Preferably, the agents according to the invention contain in addition active substances which are suitable for defoliation, desiccation and as contact herbicide. The new agents can therefore contain, for example, the following compounds with defoliating and/or desiccating action:

Inorganic compounds calcium caynamide, sodium cyanamide, cyanamide, sodium chlorate, mixture of sodium chlorate and ammonium hydrogen phosphate, magnesium chloride, potassium iodide, sodium iodide, ammonium nitrate, urea, sodium arsenite, arsenic trioxide, cacodylic acid, alkali or ammonium thiocyanate.

Alcohols, phenols and ethers 1,4-butindiole, 2-butylthiobenzthiazole, 2-vinylthiobenzthiazole, 2-heptylthiobenzthiazole, 2,4-dinitro-6-sec.butylphenol, pentachlorophenyl, 4-hydroxybenzenesulphonyl fluoride, hexafluoroacetone, 1-methyl-4-chlorobenzimidazolone, 4-isothiocyano-dimethylaniline, N,N'-ethylenedipyridilium salts, N,N'-ethylene-dipyridilium salts, β-chloro-acrylic acid, β-trichloroacetyl-α, β-dichloroacrylic acid, undecylenic acid, dithio-bis(O-ethyl-thionoformiate), dithio-bis-(O-methylthionoformiate), 7-oxahydro-[2,2,1]-heptane-2,3-dicarboxylic acid and salts thereof, sodium ethylxanthate, N,N-diethyl-S-(diethyl amino-thiolo-phosphoric diamide, tris-butylthiophosphine, S,S,S-trisbutyl-trithio-phosphoric acid, β-chloroethyl-phosphonic acid.

Furthermore, it is also possible for the new agents to contain contact herbicides from the following classes of compounds:

carbamates, thiolcarbamates, dithiocarbamates, ureas, thioureas, isoureas, xanthogenic acid derivatives, aliphatic carboxylic acids, salts and esters thereof, aromatic carboxylic acids, salts and esters thereof, phenoxycarboxylic acids, salts and esters thereof, carboxylic amides, anilides and thioamides, nitriles, phenols, phenolates, phenyl ester, diphenyl ether, pyridine derivatives, dipyridylium salts, pyridazone derivatives, uracil derivatives, imidazole and benzimidazole derivatives, thiazole and benzthiazole derivatives, triazine derivatives, thiadiazole and benzthiadiazole derivatives, oxidazine and thiadiazine derivatives, oxdiazole derivatives, chlorinated hydrocarbons, alcohols, aldehydes, ketones, nitroanilines, other quaternary salts, sulphonic acid derivatives, phosphorus compounds, inorganic compounds.

The agents according to the invention are manufactured in known manner by intimately mixing and/or grinding active substances of the formula I with the suitable carriers, optionally with the addition of dispersants or solvents which are inert towards the active substances. The active substances may take and be used in the following forms:

Solid forms:

dusts, tracking agents, granules, coated granules, impregnated granules and homogeneous granules.

Liquid forms:
a. active substances which are dispersible in water: wettable powders, pastes, emulsions:
b. solutions.

To manufacture solide forms (ducts, tracking agents), the active substances are mixed with solid carriers. Suitable carriers are, for example: kaolin, talcum, bolus, loess, chalk, limestone, ground limestone, attaclay, dolomite, diatomacous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used singly or in admixture with one another.

The particle size of the carriers for dusts is advantageously up to 0.1 mm, for tracking agents from about 0.075 to 0.2 mm, and for granules 0.2 mm or larger.

The solid forms contain the active substances in concentrations from 0.5 to 80%.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulphonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of urea and formaldehyde, and also latex products. Preferred dispersions (suspensions and emulsions) are manufactured by mixing or grinding the active substances with carriers accompanied by the addition of dispersing agents and solvents, in the process of which there result firstly dispersible active substance concentrations, such as wettable powders and emulsifiable concentrates.

The water-dispersible concentrates of the active substance i.e., wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents. The active substance concentrations in these agents are from 5 – 80%.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example condensation products of sulphonated naphthalene and sulphonated naphthalene derivatives with formaldehyde, condensation products of naphthalene or napthalene sulphonic acids with phenol and formaldehyde, as well as alkali, ammonium and alkaline earth metal salts of lignin sulphonic acid, in addition, alkylaryl sulphonates, alkali and alkaline earth metal salts of dibutyl napthalene sulphonic acid, fatty alcohol sulphates such as salts of sulphated hexadecanols, heptadecanols, octadecanols, and salt of sulphated fatty alcohol glycol ethers, the sodium salt of oleoyl, the sodium salt of olcoyl methyl tauride, ditertiary acetalene glycols, dialkyl dilauryl ammonium chloride and fatty acid alkali and alkaline earth metal salts.

Suitable anti-foam agents are silicones.

The active substance is so mixed, ground sieved and atrained with the additives mentioned above that, in wettable powders, the solid particle size of from 0.02 to 0.04 and in pastes, of 0.03 is not exeeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulphoxide, and mineral oil fractions boiling between 120° and 350°C. The solvents must be practically odorless, not phytotoxic, inert to the active substances and not readily inflammable.

Furthermore, the agents according to the invention can be applied in the form of solutions. For this purpose the active substances or several active substances of general formula II are dissolved in suitable organic solvents, mixtures of solvents or in water. Aliphatic and aromatic hydrocarbons, chlorinated derivatives thereof, alkyl naphthalenes and mineral oils singly or in admixture, can be used as organic solvents. The solutions contain the active substance in a concentration range from 1 to 20%.

In addition to fungicidal active substances, the agents described according to the invention can be mixed with other biocidally active substances or agents. Thus in order to broaden the activity spectrum the new agents may contain, for example, insecticides, fungicides, bactericides, fungistatics, bacteriostatics or nematocides, in addition to the cited active substance of the formula I. The agents according to the invention may also contain plant fertilisers, trace elements etc.

The active substances of the formula I can, for example, be formulated as follows. The parts denote parts by weight.

Powder Concentrate

To manufacture a 10% powder concentrate the following substances are mixed and ground together:
 10 parts of 2,4-bis-(N'-methyl-4'-pyridylium-s-triazine-dibromide,
 0.6 parts of sodium dibutylnaphthylsulphonate,
 1 part of naphthalenesulphonic acid/phenolsulphonic acid/formaldehyde condensate (3:2:1), 10 parts of sodium aluminium silicate
 78,4 parts kaolin.

Wettable Powder

The following constituents are used to manufacture (a) a 50%, (b) a 25% and (c) a 10% wettable powder:

a.
50 parts of 2,4-bis-(N'-ethyl-4'-pyridylium)-s-triazine-diiodide,
5 parts of sodium dibutylnaphthalene sulphonate,
b 3 parts of naphthalenesulphonic acid/phenolsulphonic acid/formaldehyde condensate (3:2:1),
20 parts of kaolin,
22 parts of Champagne chalk;

b.
25 parts of 2,4-bis-(N'-methyl-4'-pyridylium)-s-triazine-diiodide,
5 parts of sodium oleylmethyltauride,
2.5 parts of naphthalenesulphonic acid/formaldehyde condensate,
0.5 part of carboxymethyl cellulose,
5 parts of neutral potassium aluminium silicate,
62 parts of kaolin;

c.
10 parts of 2,4-bis-(N'-methyl-4'-pyridylium)-s-triazine-dichloride,
3 parts of a mixture of the sodium salts of saturated fatty alcohol sulphates,
5 parts of naphthalenesulphonic acid/formaldehyde condensate,
82 parts of kaolin.

The indicated active substance is applied to the corresponding carriers (kaolin and chalk) and then these are mixed and ground, to yield wettable powders of excellent wettability and having an excellent capacity for forming suspensions. By diluting these wettable powders with water it is possible to obtain suspensions of every desired concentration of active substance.

Paste

The following substances are used to manufacture a 45% paste:
45 parts of 2,4-bis-(N'-methyl-4'-pyridylium)-s-triazine-diiodide,
5 parts of sodium aluminium silicate,
14 parts of cetyl polyglycol ether with 8 mols of ethylene oxide,
1 part of oleyl polyglycol ether with 5 mols of ethylene oxide,
2 parts of spindle oil,
10 parts of polyethylene glycol,
23 parts of water.

The active substance is intimately mixed with the addition in appropriate devices and ground. A paste is obtained from which, by diluting it with water, is possible to manufacture suspensions of every desired concentration of active substance.

Emulsion Concentrate

To manufacture a 25% emulsion concentrate
25 parts of 2,4-bis(N'-ethyl-4'-pyridylium)-s-triazine-dibromide,
5 parts of a mixture of nonylphenolpolyoxyethoxyethylene and calcium, dodecylenesulphonate,
35 parts of 3,5,5-trimethyl-2-cyclohexan-1-one,
35 parts of dimethyl formamide, are mixed together. This concentrate can be diluted with water to give emulsions in desired concentrations.

I claim:

1. A composition for regulating the growth of plants which comprises (1) as active ingredient an effective amount of a compound of the formula

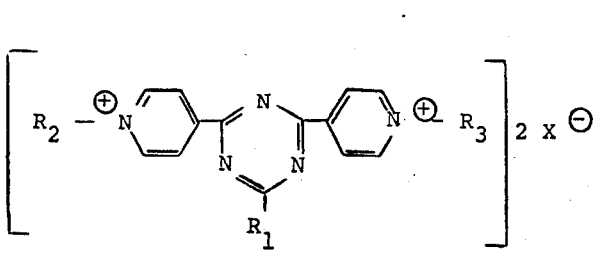

in which $R_1$ is hydrogen, alkyl of from 1 to 8 carbon atoms, haloalkyl of from 1 to 4 carbon atoms, $NH_2$, OH, phenyl, 4-pyridyl or N'-methyl-4-pyridylium; each of $R_2$ and $R_3$ independently represents alkyl of from 1 to 8 carbon atoms, alkenyl of from 3 to 7 carbon atoms, haloalkyl of from 1 to 4 carbon atoms, alkoxy of from 1 to 4 carbon atoms, alkylthio of from 1 to 4 carbon atoms, cyano or alkoxycarbonyl in which the alkoxy moeity has from 1 to 4 carbon atoms; and X is the anion of an acid selected from the group consisting of hydrochloric, hydrobromic, hydroiodic, phosphoric, thiophosphoric, sulphuric, fluoroboric, perchloric, methylsulphuric, ethylsulphuric, benzenesulphonic, p-toluenesulphonic, naphthoic, benzoic, halobenzoic, acetic, haloacetic, aminoacetic, propionic, halopropionic, butyric, lactic, stearic, oxalic, tartaric and flurosulphuric; and (2) a carrier.

2. A composition according to claim 1 in which the compound is

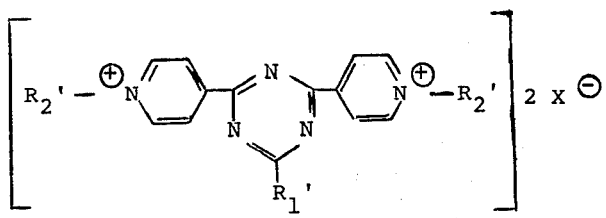

in which $R_1'$ is hydrogen or alkyl of from 1 to 4 carbon atoms; $R_2'$ is alkyl of from 1 to 4 carbon atoms; and X is chloride, bromide, iodide, methosulphate or fluorosulphate.

3. A composition according to claim 2 in which $R_1'$ is hydrogen or methyl and $R_2'$ is methyl or ethyl.

4. The composition according to claim 3 in which the compound is 2,4-bis(N'-methyl-4'-pyridylium)-s-triazine dibromide.

5. A composition for regulating the growth of plants which comprises (1) as active ingredient a compound of the formula

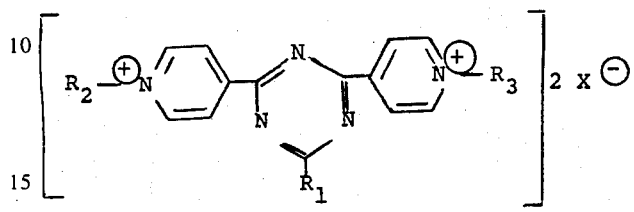

in which $R_1$ is hydrogen, alkyl of from 1 to 8 carbon atoms, haloalkyl of from 1 carbon atoms, $NH_2$, OH, phenyl, 4-pyridyl or N'-methyl-4-pyridylium; each of $R_2$ and $R_3$ independently represents alkyl of from 1 to 8 carbon atoms, alkenyl of from 3 to 7 carbon atoms, haloalkyl of from 1 to 4 carbon atoms, alkylthio of from 1 to 4 carbon atoms, cyano or alkoxycarbonyl wherein the alkoxy moiety has from 1 to 4 carbon atoms; and X is a trivalent halogen anion selected from the group consisting of $I_3$, $Br_3$, $Br_2Cl$, $I_2Br$ and $Br_2I$; and (2) a carrier.

6. A composition according to claim 5 in which the compound is

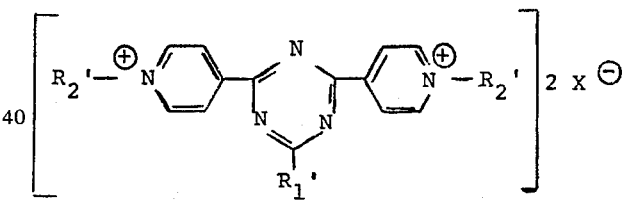

in which $R_1 40$ is hydrogen or alkyl of from 1 to 4 carbon atoms; $R_2'$ is alkyl of from 1 to 4 carbon atoms; and X is tribromide or triiodide.

7. The composition according to claim 6 in which the compound is 2,4-bis(N'-methyl-4'-pyridylium)-s-triazine bis(tribromide).

8. A method for improving the yield and facilitating the harvesting of crops which comprises applying to a crop culture, in an amount sufficient to regulate plant growth, a compound of the formula

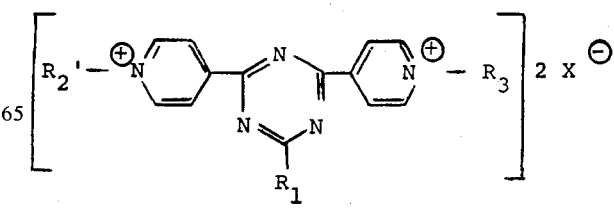

in which $R_1$ is hydrogen, alkyl of from 1 to 8 carbon atoms, haloalkyl of from 1 to 4 carbon atoms, $NH_2$, OH, phenyl, 4-pyridyl or N'-methyl-4-pyridylium; each of $R_2$ and $R_3$ independently represents alkyl of from 1 to 8 carbon atoms, alkenyl of from 3 to 7 carbon atoms, haloalkyl of from 1 to 4 carbon atoms, alkoxy of from 1 to 4 carbon atoms, alkylthio of from 1 to 4 carbon atoms, cyano or alkoxycarbonyl in which the alkoxy moiety has from 1 to 4 carbon atoms; and X is the anion of an acid selected from the group consisting of hydrochloric, hydrobromic, hydroiodic, phosphoric, thiophosphoric, sulphuric, fluoroboric, perchloric, methylsulphuric, ethylsulphuric, benzenesulphonic, p-toluenesulphonic, naphthoic, benzoic, halobenzoic, acetic, haloacetic, aminoacetic, propionic, halopropionic, butyric, lactic, stearic, oxalic, tartaric and fluorosulphuric; and (2) a carrier.

9. A method according to claim 8 in which the compound is

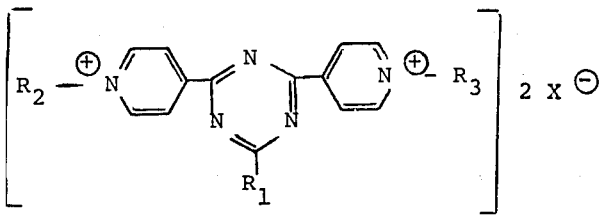

in which $R_1'$ is hydrogen or alkyl of from 1 to 4 carbon atoms; $R_2'$ is alkyl of from 1 to 4 carbon atoms; and X is chloride, bromide, iodide, methosulphate or fluorosulphate.

10. A method according to claim 9 in which $R_1'$ is hydrogen or methyl and $R_2'$ is methyl or ethyl.

11. The method according to claim 10 in which the compound is 2,4-bis(N'-methyl-4'-pyridylium)-s-triazine dichloride.

12. The method according to claim 10 in which the compound is 2,4-bis(N'-methyl-4'-pyridylium)-s-triazine dibromide.

13. The method according to claim 10 in which the compound is 2,4-bis(N'-methyl-4'-pyridylium)-s-triazine diiodide.

14. The method according to claim 10 in which the compound is 2,4-bis(N'-methyl-4'-pyridylium)-s-triazine fluorosulphate.

15. The method according to claim 10 in which the compound is 2,4-bis(N'-ethyl-4'-pyridylium)-s-triazine diiodide.

16. The method according to claim 9 in which the compound is 2,4-bis(n'-n-propyl-4'-pyridylium)-s-triazine diiodide.

17. The method according to claim 10 in which the compound is 2,4-bis(N'-methyl-4'-pyridylium)-6-methyl-s-triazine diiodide.

18. The method according to claim 10 in which the compound is 2,4-bis(N'-methyl-4'-pyridylium)-s-triazine bis(methosulphate).

19. A method for improving the yield and facilitating the harvesting of crop culture which comprises applying to a crop in an amount sufficient to regulate plant growth, a compound of the formula

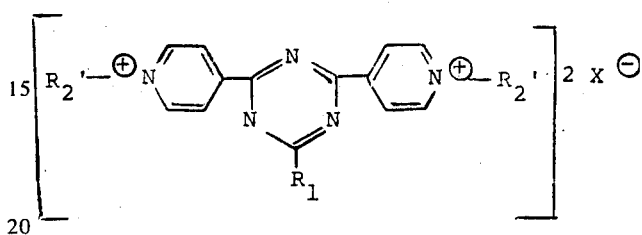

in which $R_1$ is hydrogen, alkyl of from 1 to 8 carbon atoms, haloalkyl of from 1 to 4 carbon atoms, $NH_2$, OH, phenyl, 4-pyridyl or N'-methyl-4-pyridylium; and each of $R_2$ and $R_3$ independently represents alkyl of from 1 to 8 carbon atoms, alkenyl of from 3 to 7 carbon atoms, haloalkyl of from 1 to 4 carbon atoms, alkylthio of from 1 to 4 carbon atoms, cyano or alkoxycarbonyl wherein the alkoxy moiety has from 1 to 4 carbon atoms; and X is a trivalent halogen anion selected from the group consisting of $I_3$, $Br_3$, $Br_2Cl$, $I_2Br$ and $Br_2I$.

20. A method according to claim 19 in which the compound is

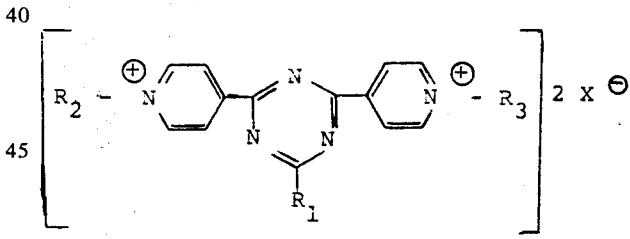

in which $R_1'$ is hydrogen or alkyl of from 1 to 4 carbon atoms; $R_2'$ is alkyl of from 1 to 4 carbon atoms; and X is tribromide or triiodide.

21. The method according to claim 20 in which the compound is 2,4-bis(N'-methyl-4'-pyridylium)-s-triazine bis(triiodide).

22. The method according to claim 20 in which the compound is 2,4-bis(N'-methyl-4'-pyridylium)-s-triazine bis(tribromide).

* * * * *

UNITED STATES PATENT OFFICE
CERTIFICATE OF CORRECTION

Patent No. 3,901,678     Dated August 26, 1975

Inventor(s) Hanspeter Fischer

It is certified that error appears in the above-identified patent and that said Letters Patent are hereby corrected as shown below:

In column 18, claim 5, line 6 (counting the structural formula as one line), the line should read:

atoms, haloalkyl of from 1 to 4 carbon atoms, $NH_2$, OH,

In column 18, claim 6, line 4 (Counting the structural formula as one line), the line should read:

in which $R_1$ is hydrogen, alkyl of from 1 to 4 car-

Signed and Sealed this twenty-third Day of December 1975

[SEAL]

Attest:

RUTH C. MASON
*Attesting Officer*

C. MARSHALL DANN
*Commissioner of Patents and Trademarks*